Figure 1:
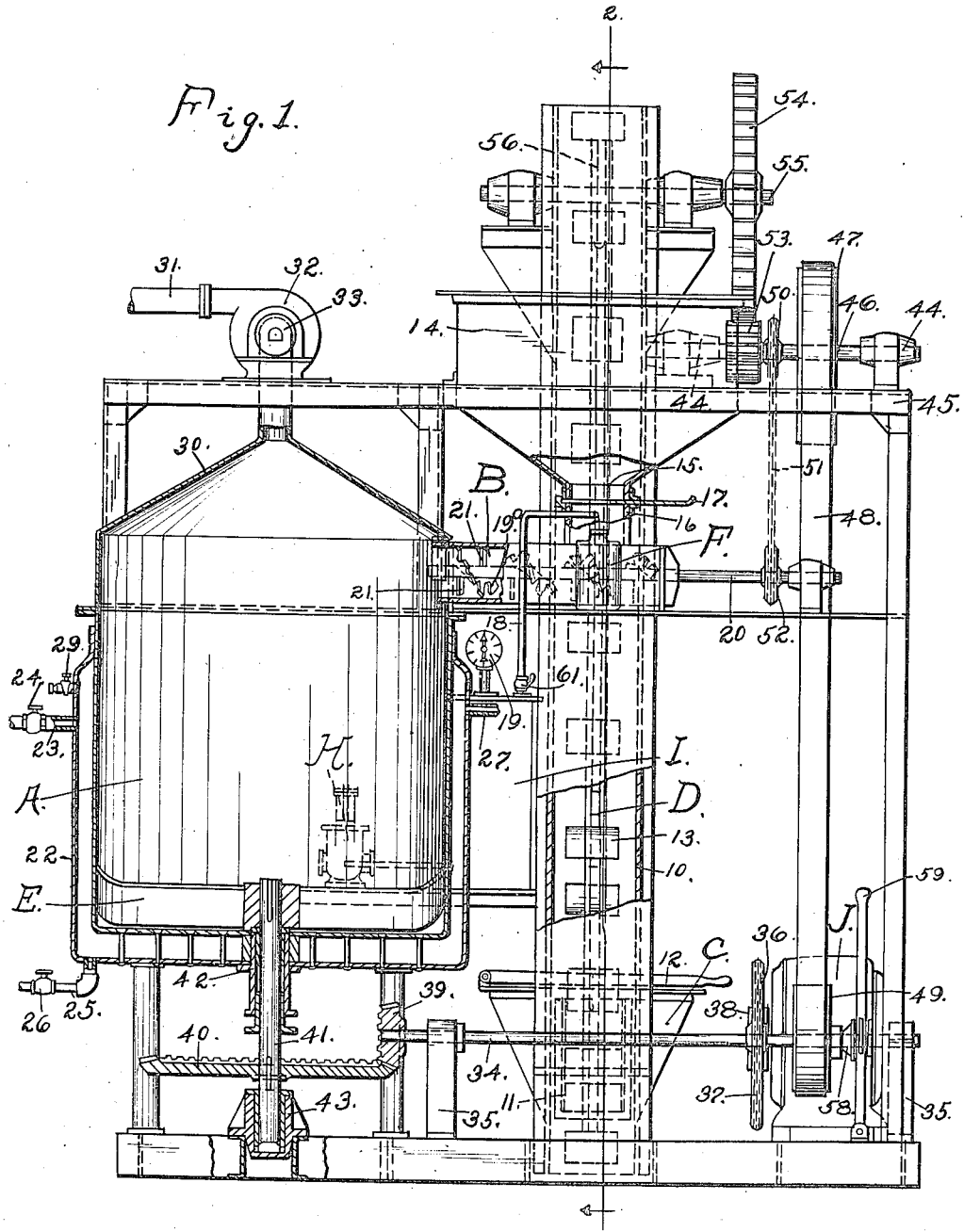

A. W. H. LENDERS.
PROCESS OF MAKING MODIFIED STARCHES.
APPLICATION FILED JUNE 25, 1914.

1,159,592.

Patented Nov. 9, 1915.
4 SHEETS—SHEET 1.

Fig. 2.

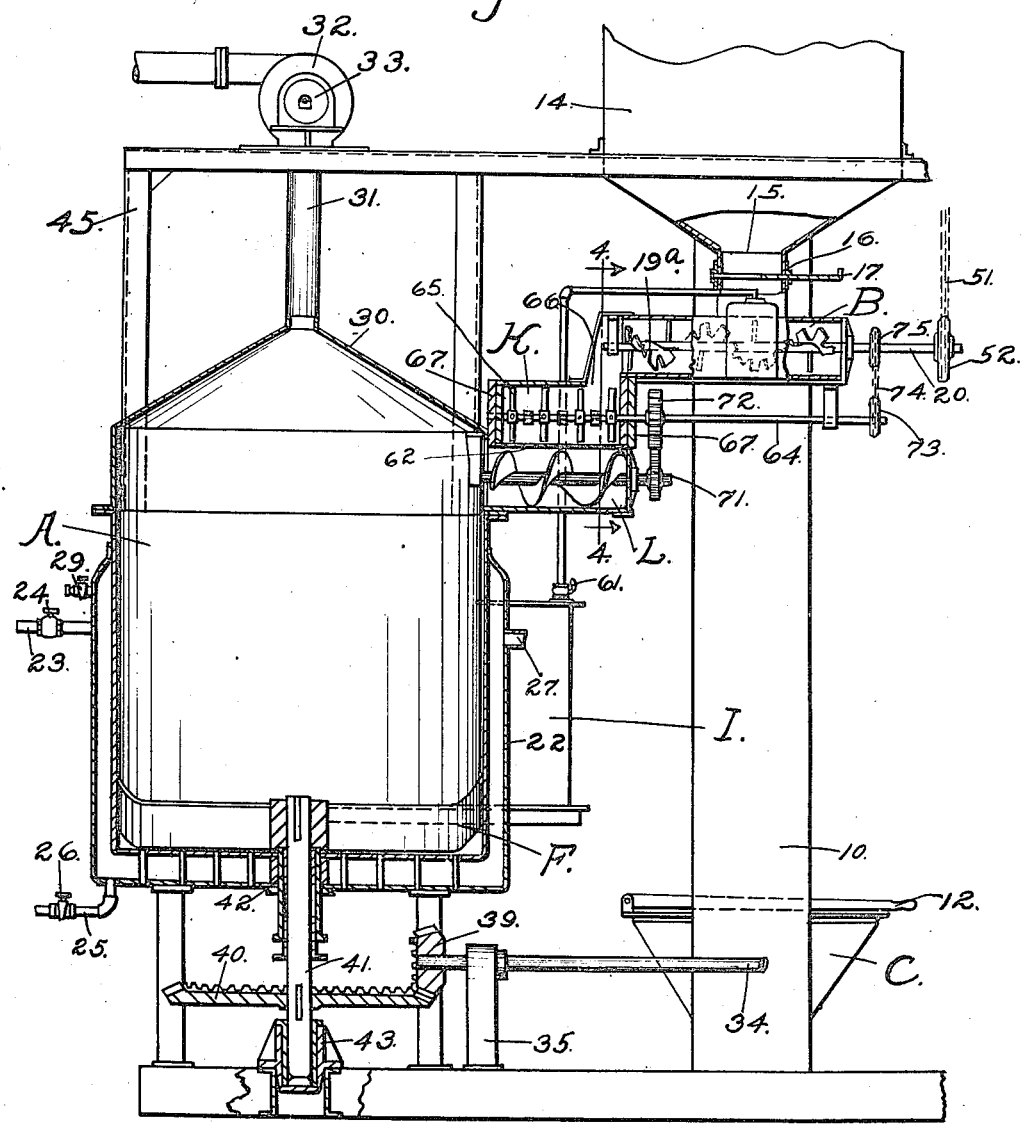

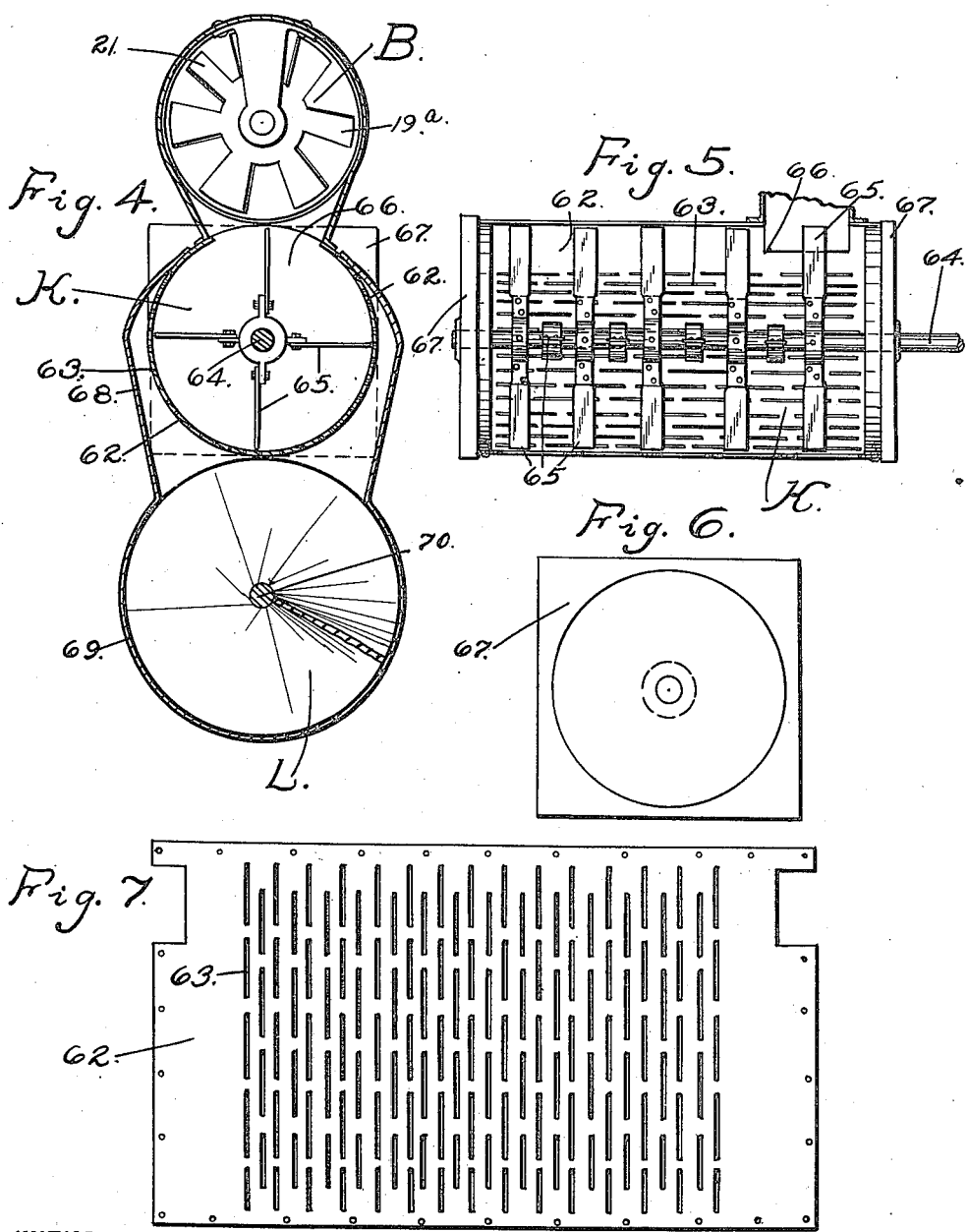

UNITED STATES PATENT OFFICE.

ADOLPH W. H. LENDERS, OF CEDAR RAPIDS, IOWA.

PROCESS OF MAKING MODIFIED STARCHES.

1,159,592.

Specification of Letters Patent. Patented Nov. 9, 1915.

Application filed June 25, 1914. Serial No. 847,280.

*To all whom it may concern:*

Be it known that I, ADOLPH W. H. LENDERS, a citizen of the United States, residing at Cedar Rapids, in the county of Linn and State of Iowa, have invented certain new and useful Improvements in Processes of Making Modified Starches, of which the following is a specification.

My invention relates to the manufacture of modified starches such as soluble starch, thin boiling starch, dextrin, British gum and allied products; and the invention has for its object to provide certain improvements in the method of converting raw starch into any of the above mentioned or allied conversion products, whereby a whiter, more uniform and otherwise better product is obtained than has been possible by the methods heretofore used; whereby the degree of conversion or dextrination may be accurately controlled to give a product of exactly the character required; whereby the formation of lumps is avoided, making it unnecessary to bolt or sift the product after conversion; and whereby, furthermore, the operation of converting the starch into the particular conversion product desired may be carried out economically, whether the amount manufactured be large or small, and by persons who are not skilled chemists or experts in this art.

The invention has for further objects such other novel improvements in the art of converting starch into dextrin and similar conversion products, as will be hereinafter described and claimed.

The process of my invention will be best understood by reference to the accompanying drawings which show a suitable apparatus by means of which the process may be carried out; it being understood that other forms of apparatus might be utilized without departure from the principles of the invention.

Figure 2:
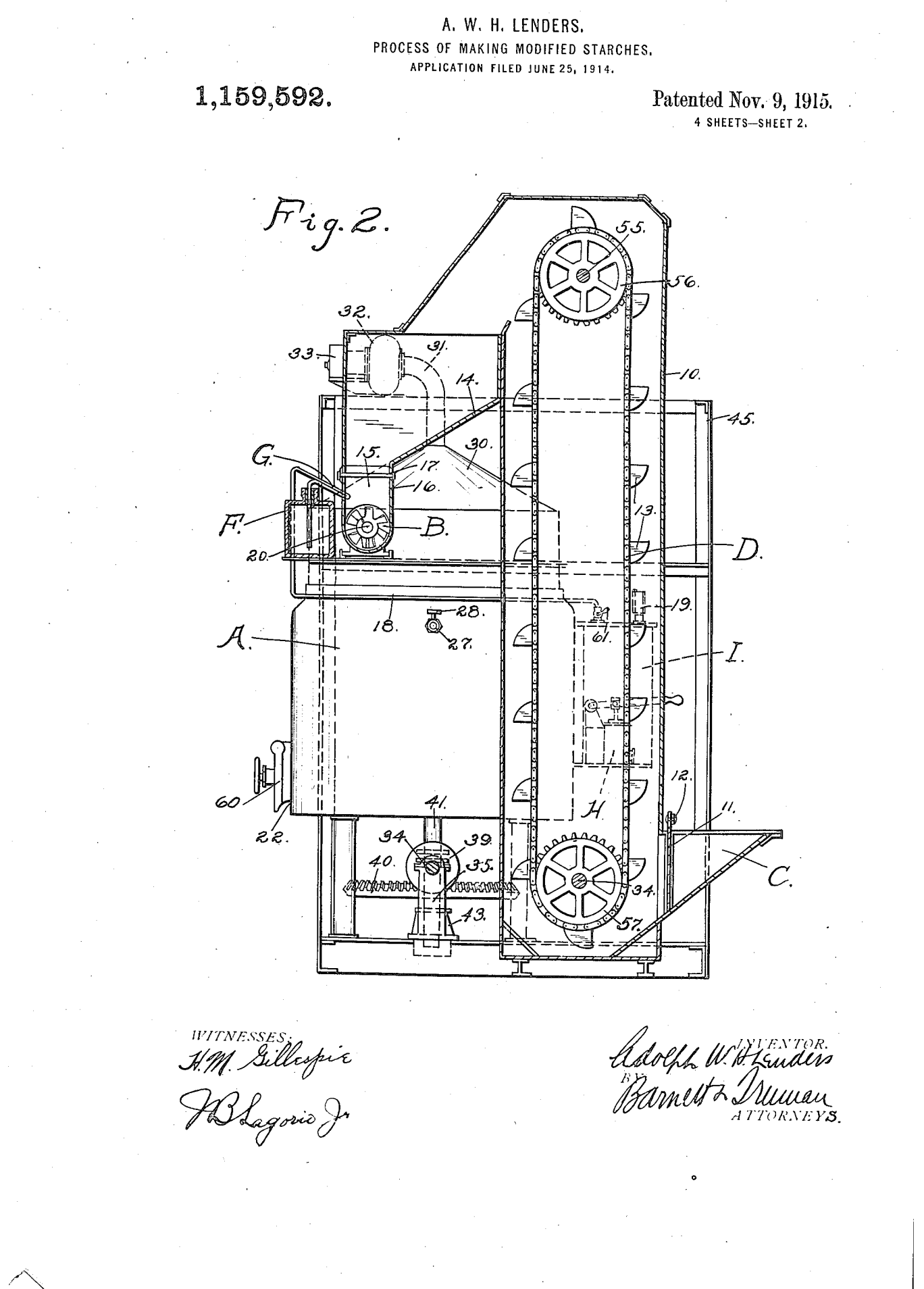

In the drawings, Figure 1 is a side elevation of the apparatus with certain parts in section and certain parts broken away for the better illustration of the construction and operation of said apparatus, Fig. 2 is a sectional elevation taken on line 2—2 of Fig. 1. Fig. 3 is a view similar to Fig. 1 showing means for subjecting the acidified starch to an additional mixing step to insure an intimate and homogeneous mixture of the starch and acid before the material is sent to the converting vessel. Fig. 4 is a sectional elevation, on an enlarged scale, taken on line 4—4 of Fig. 3. Fig. 5 is a longitudinal sectional view of the additional mixing device shown in the preceding two figures. Fig. 6 is an end elevation of one of the end castings constituting part of the device shown in Fig. 5, and Fig. 7, a developed view of the drum thereof.

Like characters of reference designate like parts in the several figures of the drawings.

The apparatus shown in the drawings is constructed as follows: A is a dextrinizing or converting vessel, B a mixing and conveying mechanism which delivers into the dextrinizing vessel, C a storage bin for the starch to be converted, D an elevator of the chain and bucket type for transporting the starch from the bin C to the converter and mixer B, E an agitator within the dextrinizing vessel A, F a vessel adapted to contain a suitable acid, for example, hydrochloric acid, and provided with an atomizing nozzle G arranged so as to introduce the acid in the form of a spray into the starch handled by the mixing and conveying mechanism B, H and I an air pump and its reservoir respectively, and J a motor for driving the several moving parts of the apparatus.

The elevator D is contained in a housing 10 separated from the bin C by a slide valve 11 operated by a hand lever 12. The starch in the bottom of the housing 10 is picked up by the buckets 13 of the elevator and discharged into a hopper 14 which leads to an opening 15 in the casing of the conveying and mixing mechanism B. The mouth 16 of the hopper is provided with a slide valve 17 whereby the rate of delivery of the starch to the mixing and conveying mechanism and hence to the dextrinizing vessel A may be regulated. The atomizing nozzle G projects into the mouth 16 of the hopper 14 so that as the starch enters the mixer it receives a properly proportioned amount of acid. A pipe 18 conducts compressed air from the tank I to the atomizing nozzle. The tank is preferably provided with a pressure gage 19 so that, by keeping the air pressure at the proper point, exactly the right amount of acid is delivered to the starch, having reference to the rate of delivery of the starch to the dextrinizing vessel which latter is controllable by the manipulation of slide valve 17. The mixing and conveying mechanism B, by means of which the acidulated starch is conveyed to the dextrinizing vessel A, is of the worm type with its flight 19ª notched and its shaft 20 provided with blades or prongs 21 whereby a thorough mixing of the starch and acid takes place between the point of application of the acid spray and the point of delivery of the acidulated starch into the dextrinizing vessel.

The dextrinizing vessel is provided with a jacket 22 supplied by steam through steam pipe 23 provided with a shut-off valve 24. Leading to the bottom of the jacket is a water supply pipe 25 having a valve 26. A water outlet pipe 27, provided with a valve 28, leads from the upper part of the jacket. 29 is a pet-cock in the upper part of the jacket through which air and steam may escape when the water is turned on. The vessel A is preferably constructed with a hood 30 terminating in an outlet pipe 31 through which the vapors resulting from the converting operation may be carried off. The pipe is preferably provided with an exhaust fan 32 operated by motor 33.

The other moving parts of the apparatus are driven from motor J as follows: 34 designates a shaft revolving in bearings in the supports 35 and carrying a sprocket wheel 36 driven by a chain 37 which extends around the sprocket wheel 38 on the armature shaft of the motor J. On one end of the shaft 34 is a bevel pinion 39 meshed with a bevel pinion 40 on a shaft 41 which extends into the vessel A through a suitable stuffing box 42, the agitator blades E being secured to this shaft. The lower end of the shaft is supported in a bearing 43. Mounted in bearings 44 on the supporting framework 45 is a countershaft 46 carrying a pulley 47 driven by a belt 48 from a pulley 49 on the shaft 34. The countershaft 46 carries a sprocket wheel 50 which drives a sprocket chain 51 extending around a sprocket wheel 52 on the shaft 20 of the conveying and mixing worm. Fixed to the shaft 46 is a gear wheel 53 which meshes with a gear wheel 54 on a shaft 55 on which is fixed the upper sprocket wheel 56 of the elevator D, the lower sprocket wheel of the elevator being designated 57. The pulley 49 is loose on the shaft 34 and is coupled thereto by means of a clutch 58 which is operated by the lever 59. The dextrinizing vessel is provided with a suitable door 60 through which the converted product part may be removed. The air pressure delivered to the atomizing nozzle G is controlled by a valve 61 on the air reservoir I.

Utilizing the apparatus above described, my method of converting starch into dextrin or other allied conversion product is as follows: The starch, in pulverulent condition, is conveyed from the storage bin C to the hopper 14 by the chain and bucket elevator D. The flow of the starch from the hopper 14 into the conveying and mixing device B is controlled by manipulating the slide valve 17. As the starch falls from the hopper into the conveyer it is acidulated by the acid sprayed from nozzle G. The amount of acid may be accurately controlled by means of the valve 61 governing the air pressure. With the starch in pulverized condition and the acid in the form of a spray, acidulation of the starch will be very complete and uniform. Practically every particle of starch will be affected by the acid. For this reason the dextrinization of the product is uniform and the product free from lumps. Heretofore it has been found difficult, in the manufacture of dextrin or allied products, to obtain uniform conversion throughout the batch and to avoid the formation of lumps. On account of the lumpy condition of the product it has been usual to sift or bolt it before shipment. My method gives a product which is uniformly converted throughout and which contains no lumps. Even if the starch delivered to the conveyer should be lumpy, the lumps will be broken up while moving through the dextrinizing vessel. The construction of the conveyer thoroughly mixes the material together so that even if the initial acidulation is not perfectly uniform, the mixture of starch and acid is perfect and homogeneous before the material reaches the converting vessel. Preferably the entire batch of starch is acidulated and delivered to the converting vessel, as above described, before the process of conversion is commenced, although the heat may be turned on when the batch begins to run into the converter.

The conversion of the starch into the desired product is accomplished by introducing steam into the jacket 22 while keeping the material in agitation by driving the mixer agitator E. As soon as the starch has been converted to the extent necessary to give the desired product, the steam is shut off by closing valve 24 and immediately thereafter cold water is injected into the steam jacket by opening valve 26 in the water pipe 25. The steam and air escape through pet-cock 29 which is opened at the same time. The water, after filling the jacket, flows out through the pipe 27, the valve 28 of which is opened when the water is turned on. The circulation of water through the jacket is kept up until the product is cool. This cooling of the batch before withdrawing it from the converting vessel by immediately stopping the process of conversion gives the product a uniformity which is lacking when methods which have heretofore been used are employed. Ordinarily it has been the custom, after shutting off the heat, to discharge the converted product from the dextrinizing vessel, after which it is allowed to cool or is artificially cooled. The result of this method is that the residual heat in the material prolongs the process of conversion, this conversion being more extensive in some parts of the batch than in others, so that, in the first plate, one does not obtain exactly the degree of conversion required in order to give a product of the character desired, since the amount of conversion due to residual heat is not easily calculated, and, in the second place, the product is not uniform, a higher degree of conversion being reached in some portions of the batch than in others.

In Figs. 3 to 7 inclusive, I have shown an apparatus similar in its general organization to the apparatus shown in the first two figures but modified so that the starch after being sprayed with the acid and mixed in the mixer B is subjected to further treatment having for its purpose to insure the complete and homogeneous acidification of every particle of the starch and prevent over-acidulation of certain particles with consequent charring and formation of black specks which all dextrin, and like products, manufactured according to commercial processes heretofore employed contain to a greater or less extent and which are detrimental to the product even when in quantities which cannot be readily observed by casual inspection. With this end in view there is interposed between the mixer B and the converting vessel A a mill or auxiliary mixer, designated as a whole by the letter K. The material is introduced from this device into the converting vessel A by any suitable means, for example, by means of a screw conveyer L which occupies the same position with respect to the converting vessel as does the mixer B in the other form of apparatus.

The auxiliary mixing device consists of a preferably cylindrical drum 62 formed with a plurality of relatively narrow elongated slits 63 having preferably the staggered arrangement shown, within which drum is arranged a shaft 64 carrying a number of paddles or beaters 65, the ends of which work in close proximity to the drum. The material from the mixer B is fed into the drum 62 through an opening 66 and is forced by the paddles 65 through the slits 63 in the form of thin ribbons. This makes the mixture of the acid with the starch complete and perfectly homogeneous. If any lumps remain after the mixing in the mixer B they are necessarily broken up when the starch passes through the slitted fabric of the drum. The drum is closed at opposite ends by suitable heads 67. Preferably the drum is surrounded by a housing 68, the lower part 69 of which serves as a housing for the screw conveyer L, the shaft 70 of which is provided with a gear 71 meshed with a gear 72 on the shaft 64. The latter is provided with a sprocket wheel 73 driven by a chain 74 from a sprocket wheel 75 on the shaft 20 of mixer B.

This application is a continuation with respect to the process illustrated by Figs. 1 and 2 herein of my co-pending application, Serial No. 766,332, filed May 8, 1913, for apparatus for making modified starches.

No claim is made herein to the apparatuses here disclosed as these apparatuses are claimed in the co-pending application just referred to and in my co-pending application Serial No. 51258 filed September 17, 1915.

I claim:

1. The method of making modified starches, which consists in feeding a batch of pulverized starch a little at a time into a dextrinizing vessel, adding to the starch during the operation of feeding it into the vessel a suitable acid at a rate proportioned to the rate at which the starch is fed so that the starch is uniformly acidulated, and applying heat to the material in the dextrinizing vessel while keeping it in agitation until the desired degree of conversion is reached.

2. The method of making modified starches, which consists in feeding a batch of pulverized starch a little at a time into a dextrinizing vessel, adding to the starch during the operation of feeding it into the vessel a suitable acid at a rate proportioned to the rate at which the starch is fed so that the starch is uniformly acidulated, applying heat to the material in the dextrinizing vessel while keeping it in agitation until the desired degree of conversion is reached, withdrawing the heat, and bringing a cooling fluid into contact with the outside of said vessel.

3. The method of making modified starches, which consists in feeding a batch of pulverized starch continuously and at a uniform rate into a dextrinizing vessel, adding acid to said stream of starch continuously at a uniform rate, and after the entire batch has been introduced into the dextrinizing vessel applying heat to said vessel and agitating the material therein.

4. The method of making modified starches, which consists in feeding a batch of pulverized starch a little at a time into a dextrinizing vessel, adding to the starch during the operation of feeding it into the vessel a suitable acid in the form of a spray at a rate proportioned to the rate at which the starch is fed so that the starch is uniformly acidulated, and applying heat to the material in the dextrinizing vessel while keeping the same in agitation until the desired degree of conversion is reached.

5. The method of making modified starches, which consists in feeding pulverized starch into a dextrinizing vessel and acidulating the starch while being fed into the vessel by means of an acid spray and thereafter converting the acidulated starch by applying heat thereto while keeping the material in agitation.

6. The method of making modified starches, which consists in feeding a batch of pulverized starch a little at a time into a dextrinizing vessel, adding to the starch during the operation of feeding it into the vessel a suitable acid at a rate proportioned to the rate at which the starch is fed so that the starch is uniformly acidulated, and, after the batch has been introduced into said vessel, applying heat thereto while keeping the material in agitation, shutting off the heat when the desired degree of conversion has been reached and immediately applying thereto a cooling medium so as to stop the process of conversion.

7. The method of making modified starches, which consists in feeding a batch of pulverized starch continuously and at a uniform rate into a dextrinizing vessel, adding acid to said stream of starch in the form of a spray, and, after the entire batch has been introduced into the dextrinizing vessel, applying heat to the vessel and agitating the material therein.

8. The method of making modified starches, which consists in feeding a batch of pulverized starch continuously and at a uniform rate into a dextrinizing vessel, acidulating the stream of starch by the application thereto of acid in the form of a spray, and converting the acidulated starch by applying heat thereto while keeping the same in agitation.

9. The method of making modified starches, which consists in feeding a batch of pulverized starch continuously and at a uniform rate into a dextrinizing vessel, adding acid to said stream of starch continuously at a uniform rate, and, after the entire batch has been introduced into the dextrinizing vessel, applying heat to said vessel and agitating the material therein until the desired degree of conversion has been reached and thereupon shutting off the heat and immediately cooling the material by applying thereto a cooling medium.

10. The improvement in the method of making modified starches, which consists in shutting off the heat as soon as the desired degree of conversion in a batch of the product has been reached and thereupon immediately applying a cooling medium to the entire batch so as to stop the process of conversion throughout the same.

11. The method of making modified starches, which consists in heating acidulated starch in a dextrinizing vessel until the desired degree of conversion has been effected and thereupon shutting off the heat and applying a cooling medium to the exterior of said vessel.

12. The method of making modified starches, which consists in acidulating pulverulent starch a little at a time by means of a spray, and, after a batch has been acidulated in this manner, applying heat thereto while keeping the material in agitation until the desired degree of conversion has been reached, then withdrawing the heat and immediately applying a cooling medium to the entire batch so as to stop the process of conversion throughout the same.

13. The method of making modified starches, which consists in introducing a suitable acid, into pulverulent starch, producing a complete and homogeneous aciduducing a complete and homogeneous aciduducing a complete and homogeneous aciduation of the starch by forcing the starch and acid a little at a time through a screen formed with narrow, elongated slits, then applying heat to the material and keeping it in agitation until a desired degree of conversion has been reached.

14. The improvement in the method of manufacturing modified starches which consists in producing a complete and homogeneous acidulation of the starch before conversion by mixing the acid with the starch and thereupon forcing the material through a perforated screen.

ADOLPH W. H. LENDERS.

Witnesses:
C. W. BLOOMHALL,
A. M. DOUGLAS.

Correction in Letters Patent No. 1,159,592.

It is hereby certified that in Letters Patent No. 1,159,592, granted November 9, 1915, upon the application of Adolph W. H. Lenders, of Cedar Rapids, Iowa, for an improvement in "Processes of Making Modified Starches," an error appears in the printed specification requiring correction as follows: Page 3, line 4, for the word "plate" read *place;* and that the said Letters Patent should be read with this correction therein that the same may conform to the record of the case in the Patent Office.

Signed and sealed this 7th day of December, A. D., 1915.

[SEAL.]

R. F. WHITEHEAD,
*Acting Commissioner of Patents.*

Cl. 127—10.